United States Patent [19]

Kniprath et al.

[11] 4,251,489
[45] Feb. 17, 1981

[54] PROCESS FOR PRODUCING A COPPER SULFATE SOLUTION

[75] Inventors: Elmar Kniprath, Hamburg; Gerd Mrusek, Buxtehude; Hermann Priebe; Claus Reppenhagen, both of Hamburg, all of Fed. Rep. of Germany

[73] Assignee: Nordeutsche Affinerie, Hamburg, Fed. Rep. of Germany

[21] Appl. No.: 18,635

[22] Filed: Mar. 8, 1979

[30] Foreign Application Priority Data

Mar. 9, 1978 [DE] Fed. Rep. of Germany ....... 2810226

[51] Int. Cl.$^3$ ............................................... C01G 3/10
[52] U.S. Cl. ....................................... 423/41; 423/557
[58] Field of Search ............................ 423/41, 45, 557

[56] References Cited
U.S. PATENT DOCUMENTS 2,533,245   12/1950   Harike .................................. 423/557

FOREIGN PATENT DOCUMENTS 1007307   10/1957   Fed. Rep. of Germany ........... 423/557
1036240    8/1958   Fed. Rep. of Germany ........... 423/557
1188035    4/1970   United Kingdom ..................... 423/41

OTHER PUBLICATIONS

Ullmann's *Enzyklopadie der Techn. Chemie*, 3rd Ed. vol. 11, p. 249 (1960).

*Primary Examiner*—Brian E. Hearn
*Attorney, Agent, or Firm*—Karl F. Ross

[57] ABSTRACT

A process for extracting copper from a compact mass, such as bulk metallic copper and/or copper highly contaminated with insoluble substances, in which the mass of metallic copper is leached with a liquor containing $Cu^{2+}$ ions and $SO_4^{2-}$ ions, the liquor being oxidized separately from the leaching stage, e.g. with oxidizing agents including oxygen-containing gases such as air. At least part of the oxidized liquor is recycled to the leaching stage for the metallic copper. The copper sulfate solution which thus results is recovered.

8 Claims, 1 Drawing Figure

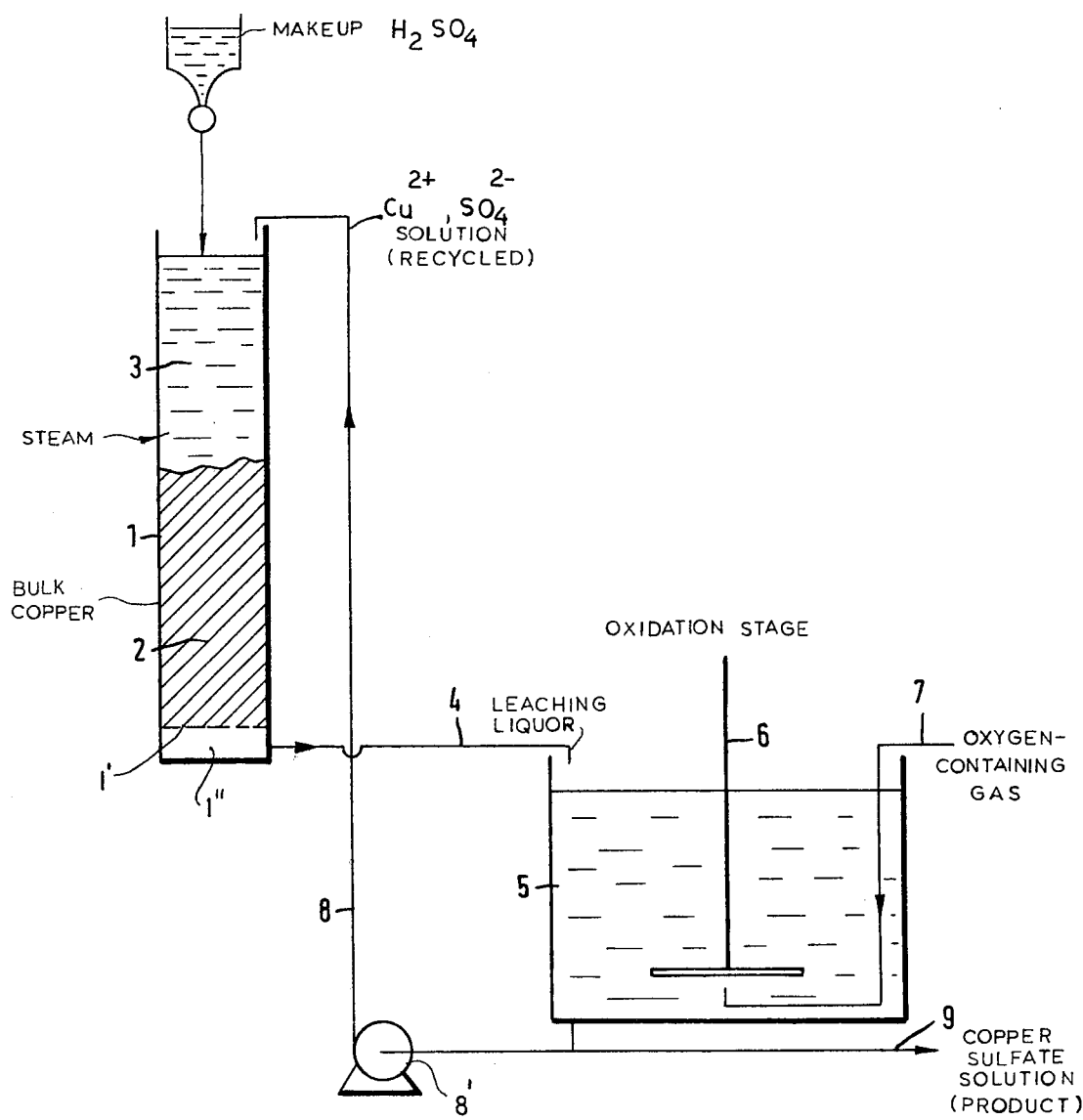

PROCESS FOR PRODUCING A COPPER SULFATE SOLUTION

FIELD OF THE INVENTION

The present invention relates primarily to a process for producing a copper sulfate solution and, more particularly, to the production of copper sulfate solution from metallic copper, especially compact bulk metallic copper and/or metallic copper materials which are highly contaminated with insoluble substances.

BACKGROUND OF THE INVENTION

Copper sulfate solutions can be produced from, for example, copper oxide which is dissolved in sulfuric acid (German patent No. 1,007,307) or by leaching metallic copper with a sulfuric acid solution in the presence of oxygen (German patent No. 1,036,240 and Ullmann's Enzyklopädie der Techn. Chemie, 3rd Edition, vol. 11, p. 249; 1960).

Metallic copper can also be leached by passing copper sulfate and sulfuric acid together with air through metallic bulk copper. At least part of the solution which traverses the bulk material is subjected to temperature equilibration and then is recycled to the bulk material while part of the solution is withdrawn as the product if desired (see U.S. Pat. No. 2,533,245).

Processes in which copper oxide is used as a starting material have the significant disadvantage that the copper oxide must be produced by a separate process step, for example, the atomization and simultaneous oxidation of the metallic copper.

Processes which involve the leaching of metallic copper with sulfuric acid or a sulfuric acid solution containing copper sulfate have the disadvantage that it is difficult to provide and maintain within the bulk material the uniform supply of oxygen which is essential for oxidation.

The difficulties increase as the particle size of the metallic copper decreases.

Increasingly, attention has been directed to the use of sections or particles of wire obtained from shredders as the starting material. Where such sections, pieces and particles of wire are used, it is virtually impossible to ensure a uniform flow of gas therethrough, thereby increasing the problems which have been encountered when oxidation with gaseous oxygen within the body of metallic bulk material is required.

OBJECTS OF THE INVENTION

It is the principal object of the present invention to provide a process which is free from the disadvantages of earlier systems, especially those mentioned above, and which nevertheless affords an economical and readily controlled process for producing copper sulfate solution and/or leaching copper from a compact mass of metallic copper or a mass of metallic copper which contains a high level of insoluble impurities.

Another object of the invention is to provide a method of producing a copper sulfate solution which does not involve high cost, both with respect to equipment and processing technology, is energy efficient and is easily controlled.

A further object of this invention is to provide an improved process for producing copper sulfate which can be carried out in equipment at minimum cost.

SUMMARY OF THE INVENTION

These objects are attained, in accordance with the present invention, in a process for producing copper sulfate solution and/or leaching copper from a copper-containing material, especially compact bulk metallic copper and metallic copper highly contaminated with insoluble substances, in which the leaching is carried out by a liquor which contains $Cu^{2+}$ ions and $SO_4^{2-}$ ions and which requires oxidation by an oxygen-containing gas. According to the invention, the process is carried out by leaching the metallic copper in a first stage and oxidizing the resulting liquor in a second stage, the two stages being spaced apart and at least part of the oxidized liquor being recycled to the leaching stage for the metallic copper.

In the first step of the process, metallic copper is reacted in accordance with the equation:

$$Cu^{2+} + Cu \rightarrow 2Cu^{+} \qquad \text{I}$$

In the second step, in which the oxidation is carried out, the copper (I) ion is reacted in accordance with the equation:

$$Cu^{30} \rightarrow Cu^{2+} + e^{-} \qquad \text{II}$$

($e^{-}$ = electron)

In spite of the low stability of the $Cu^{+}$ formed in equation I, the leaching and oxidizing treatment can be carried out in spaced apart stages. This surprising result is contrary to the hitherto known characteristics of the $Cu^{+}$ or monovalent copper ion and is utilized in the present invention to allow the oxidation to be effected in a second stage spatially and temporally removed from the first stage.

According to a feature of the invention, the mass of metallic copper is traversed by a solution which contains $Cu^{2+}$ ion and $SO_4^{2-}$ ions in the form of chemically bound and preferably also free sulfuric acid.

This liquor flow through the metallic copper is effected, in accordance with the best-mode embodiment of the invention, by passing the liquor from the bottom to the top or from the top to the bottom through a stationary mass of the bulk metallic copper to which additional copper-containing material may be added as copper is leached therefrom.

Alternatively, the metallic copper may move while it is being traversed by the liquor, e.g. the liquor may be passed through the bulk material at such a velocity that agitation can result or the metallic copper can be leached with the liquor in a rotating drum.

The liquor resulting from the leaching step is then subjected to the oxidizing treatment with a gas-containing oxygen, namely, air, oxygen-enriched air or pure oxygen. This treatment is effected, in the best-mode embodiment of the invention, in a gas-supplied agitating vessel or mixer or in a tank lined with nozzle blocks through which the air is forced to bubble or by injection by jets into the liquid.

These two process steps can be carried out in two totally separate reactor vessels. Alternatively, the two reactors can be combined in a single structural unit although the two stages are spatially and temporally separated therein. In the latter case, a grate can be installed in a reactor having any desired cross section and the metallic copper can be received in baskets placed upon the grate. The liquor is disposed under the grate and is conducted by risers above the bulk copper. The oxidizing treatment is then effected in the space under the grate and/or in the risers. If the oxidizing treatment is effected in the risers, the oxygen-containing gas may also be used to displace or recycle the liquor to the leaching stage by the air-lift pump principle or the Mammoth pump principle.

Best results have been obtained in accordance with our invention when the starting solution contains free sulfuric acid and $Cu^{2+}$ ions in comparatively small concentrations. The oxidized solution can be completely recycled to increase the copper concentration to a value desired in the withdrawn or ultimate copper sulfate solution, i.e. to the value needed for further processing, e.g. in the formation of crystalline copper sulfate.

As sulfuric acid is consumed in the overall process, free sulfuric acid should be supplied continuously or in appropriate quantities, i.e. the solution or the liquor should be replenished with sulfuric acid from time to time.

The reaction in the leaching stage is promoted by the difference between the $Cu^+$ concentration at the boundary layer joining the metallic copper and the $Cu^+$ equilibrium constant which increases with temperature and with the $Cu^{2+}$ concentration. For this reason the $Cu^{2+}$ concentration is preferably adjusted to a value above 5 g/l at the beginning of the leaching step.

Substantially the same purpose is served by other preferred features of the invention. For example, the metallic copper should be leached at a temperature above 40° C. and up to the boiling point of the liquor.

The liquor is preferably recycled to the laching stage at such a rate that the time of contact with the metallic copper is less than 5 minutes, preferably less than 60 seconds (i.e. the residence time of the liquor in the leaching stage is less than 5 minutes and preferably less than 60 seconds).

Finally, the liquor should be recycled to the leaching stage at such a rate that the $Cu^+$ concentration in the effluent from the leaching stage is much less than the equilibrium concentration.

The last two features require that the velocity of flow of the liquor through the metallic copper should be as high as possible. If the liquor flows through the bulk metallic copper from top to bottom, a sufficiently high velocity of flow through the bulk material can be obtained by providing a head or level of the column of liquid above the bulk material at a sufficient height that the liquid will be driven through the bulk material at the desired rate. Alternatively, the height of the column or body of the bulk material can be decreased to decrease the resistance to flow of the liquid.

It has been found to be desirable to increase the $Cu^{2+}$ ion concentration to values which are as high as possible and to control the oxidizing treatment so that the recycled liquor is virtually free from $Cu^+$ ions. Another important desiderata of the present invention is the use of metallic copper having a high surface area per unit volume if it is possible to control this surface area, e.g. by the degree of comminution of the copper-containing solids.

When the $Cu^{2+}$ concentration which is desired for further processing has been reached, a partial stream in an amount corresponding to the quantity of copper metal dissolved is withdrawn continuously or periodically and is replaced by sulfuric acid. The liquor which has been withdrawn may be clarified, if desired, and may be treated by conventional techniques to crystalize copper sulfate. The mother liquor from the crystalization stage can then be recycled to the leaching process.

Alternatively, the copper sulfate liquor may be used for any desired process in which copper sulfate solutions are usually employed. For instance it may be used in the production of Bordeaux mixture for the protection of plants by adding the copper sulfate solution to a calcium hydroxide solution.

The most significant advantage afforded by the process of the present invention is that the metallic copper need no longer be directly contacted with oxygen because the overall reaction is divided into two spatially and temporally separate stage.

For the reason the process is particularly valuable when the starting materials form compact bulk materials and/or are strongly contaminated with insoluble substances which in known processes inhibit the contact between metallic copper and oxygen.

However, it must be emphasized that the process can be used with metallic copper of any kind and in any form.

Another advantage of the process of the present invention is that it has a high space-time yield (high leaching rate per unit volume) so that a relatively small leaching reactor can be used and for this reason can easily be emptied, e.g. by tilting.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating the leaching and oxidation stages carried out in two spaced-apart reactors.

SPECIFIC DESCRIPTION

The leaching reactor 1 is here shown as a tiltable column which is formed with a grate 1' above a free space 1" in which the liquor is collected and withdrawn.

The leaching reactor 1 contains bulk metallic copper 2 and is traversed by the leaching liquor 3 forming a head above the metallic copper at a height which is automatically controlled in dependence upon the resistance of the bulk material to flow and upon the rate at which the liquor is supplied. The liquor is continuously withdrawn from the chamber 1" and is led by conduit 4 to an agitating vessel 5.

In the embodiment illustrated, the liquor in the agitating vessel is agitated by a stirrer 6 beneath which air is introduced via a conduit 7. Liquor is recycled to the leaching reactor 1 via a conduit 8 and a recycling pump 8'. A partial stream of the liquor is periodically or continuously withdrawn at 9 for further use for recrystallization.

SPECIFIC EXAMPLE

The leaching reactor 1 was a column-shaped reactor with a height of 2 m and an inside diameter of 0.107 m. The agitating vessel 5 has an inside diameter of 0.400 m and was provided with a disk impeller 6 whose disk had a diameter of 0.150 m.

Initially the leaching reactor is supplied with 19.5 kg of copper fines which form a pile having a height of 1.26 m. The agitating vessel 5 was supplied with 70 l of a solution containing 65 g/l of copper and 196 g/l of H$_2$SO$_4$. The reactor 5 was at a temperature of 90° C.

The impeller was rotated at 720 rpm and air at a rate of 2 m$^3$/hour was fed below the disk impeller 6 via the conduit 7.

Solution at a rate of 1.35 m$^3$/hour is withdrawn from the bottom of the agitating vessel and is pumped via conduit 8 onto the bulk copper. Owing to the resistance of the bulk material, the solution 3 grows to a total height of 2 m.

The solution 3 flowed through the bulk material with a residence time of 30 seconds and into the agitating vessel 5. The temperature of the solution 3 was maintained at 90° C. and losses due to evaporation were compensated by direct injection of steam.

After 8 hours the copper concentration in the liquor had increase to 180 g/l and the sulfuric acid concentration had decreased to 18.5 g/l. During that period 7.210 kg of copper had been leached to the mass, corresponding to a leaching of 88 kg of copper per hour per m$^3$ of the copper mass.

When the latter concentration had been reached, 10 l of solution were branched off per hour and were cooled to 20° C. to crystallize CuSO$_4$.5H$_2$O in an amount of 3.929 kg of the crystalline material, corresponding to 1 kg/hour of dissolved copper, the crystals being separated.

The mother liquor, which still contained 80 g/l of copper, was replenished with 1.6 kg of H$_2$SO$_4$ (96% by weight) and then recycled to the agitating vessel 5. The leaching reactor 1 was fed with 1 kg of copper per hour.

We claim:

1. A process for producing a copper sulfate solution which comprises the steps of:
    (a) leaching a mass of metallic copper with a solution whose solute consists essentially of Cu$^{2+}$ and SO$_4^{2-}$ ions without the introduction of an oxidizing gas to produce a leaching liquid;
    (b) spatially and temporally removed from step (a) oxidizing the leaching liquid produced in step (a) with an oxygen-containing gas, thereby producing a copper sulfate solution; and
    (c) recycling a portion of the oxidized liquid from step (b) to the leaching of step (a) as at least part of the leaching liquid thereof.

2. The process defined in claim 1 wherein the Cu$^{2+}$ concentration of the liquid used to leach the metallic copper in step (a) is at least 5 g/l at least at the beginning of the leaching of the mass.

3. The process defined in claim 1 wherein the metallic copper is leached in step (a) at a temperature above 40° C.

4. The process defined in claim 1 wherein leaching liquor is recycled to the leaching step (a) at such a rate that the time of contact with the metallic copper is less than 5 minutes in step (a).

5. The process defined in claim 1 wherein leaching liquid is recycled to the leaching stage at such a rate that the Cu$^+$ concentration in the effluent from the leaching stage is much less than the equilibrium concentration.

6. The process defined in claim 1 wherein the mass of copper in step (a) is compact bulk metallic copper.

7. The process defined in claim 1 wherein the mass of metallic copper in step (a) is copper highly contaminated with insoluble substances.

8. A process for producing a copper sulfate solution which comprises the steps of:
    (a) leaching a mass of metallic copper with a liquor containing Cu$^{2+}$ and SO$_4^{2-}$ ions to produce a leaching liquid;
    (b) spatially and temporally removed from step (a) oxidizing the leaching liquid produced in step (a) with an oxygen-containing gas, thereby producing a copper sulfate solution; and
    (c) recycling at least a portion of the oxidized liquid from step (b) to the leaching of step (a) as at least part of the leaching liquor thereof at such a rate that the time of contact with the metallic copper is less than 60 seconds in step (a).

* * * * *